United States Patent
Ogden et al.

(10) Patent No.: US 10,330,946 B1
(45) Date of Patent: Jun. 25, 2019

(54) SYMMETRIC CUBE POLARIZING BEAM SPLITTER

(71) Applicant: Moxtek, Inc., Orem, UT (US)

(72) Inventors: Shaun Ogden, Saratoga Springs, UT (US); Kerry Olivier, Provo, UT (US); Hua Li, Lindon, UT (US); David S. Crawford, Salem, UT (US); David Vern Nelson, Orem, UT (US)

(73) Assignee: Moxtek, Inc., Orem, UT (US)

( * ) Notice: Subject to any disclaimer, the term of this patent is extended or adjusted under 35 U.S.C. 154(b) by 260 days.

(21) Appl. No.: 15/478,705

(22) Filed: Apr. 4, 2017

Related U.S. Application Data

(60) Provisional application No. 62/331,889, filed on May 4, 2016.

(51) Int. Cl.
  *G02B 5/30* (2006.01)
  *G02B 27/28* (2006.01)
  *G02B 5/04* (2006.01)
  *H04N 9/31* (2006.01)

(52) U.S. Cl.
  CPC ............ *G02B 27/283* (2013.01); *G02B 5/04* (2013.01); *G02B 5/3025* (2013.01); *G02B 5/3058* (2013.01); *H04N 9/3167* (2013.01)

(58) Field of Classification Search
  CPC .. G02B 27/283; G02B 5/3025; G02B 5/3058; G02B 5/04; G02B 27/149; G02F 1/133536; G02F 2001/133548; G03B 21/006
  USPC ............ 359/485.05, 478.03; 249/96; 353/20
  See application file for complete search history.

(56) References Cited

U.S. PATENT DOCUMENTS

| | | | |
|---|---|---|---|
| 6,284,085 B1 | 9/2001 | Gwo | |
| 6,288,840 B1 | 9/2001 | Perkins et al. | |
| 6,548,176 B1 | 4/2003 | Gwo | |
| 6,714,350 B2 | 3/2004 | Silverstein et al. | |
| 7,570,424 B2 | 8/2009 | Perkins et al. | |
| 2007/0297052 A1 | 12/2007 | Wang et al. | |
| 2015/0346497 A1 | 12/2015 | Huang et al. | |

*Primary Examiner* — Kristina M Deherrera
(74) *Attorney, Agent, or Firm* — Thorpe, North & Western, LLP

(57) ABSTRACT

A cube polarizing beam splitter (PBS) can have one or more of the following characteristics: high contrast (Tp/Ts), acceptance of a large range of incident angles, broadband, and symmetry. The cube PBS can include a pair of wire-grid polarizers sandwiched between a first prism and a second prism. There can be a boundary layer between the wire-grid polarizers. An optical path length of a transmitted beam can be equal or very close to an optical path length of a reflected beam.

20 Claims, 4 Drawing Sheets

SYMMETRIC CUBE POLARIZING BEAM SPLITTER

CLAIM OF PRIORITY

This application claims priority to U.S. Provisional Patent Application No. 62/331,889, filed on May 4, 2016, which is incorporated herein by reference in its entirety.

FIELD OF THE INVENTION

The present application is related generally to cube polarizing beam splitters.

BACKGROUND

Cube polarizing beam splitters (PBSs for plural or PBS for singular) can be used to polarize a beam of light and split it into two, oppositely-polarized light beams. The effectiveness or performance of a cube PBS can be based on a fraction transmission of a predominantly-transmitted polarization (e.g. Tp), a fraction transmission of a predominantly-reflected polarization (e.g. Ts), and a fraction reflection of the predominantly-reflected polarization (e.g. Rs).

Users of PBSs often desire one or more of the following: high contrast (Tp/Ts), good performance across a large range of incident angles, and good performance across a large wavelength range. It is difficult to provide a cube PBS to satisfy all of these desires.

Another desirable aspect of a cube PBS is symmetry, meaning equality of an optical path length of a transmitted polarization and an optical path length of a reflected polarization.

SUMMARY

It has been recognized that it would be advantageous to provide a cube polarizing beam splitter (PBS for singular or PBSs for plural) with high contrast (Tp/Ts), good performance across a large range of incident angles, good performance across a large wavelength range, and symmetry. The present invention is directed to various embodiments of cube PBSs that satisfy these needs. Each embodiment may satisfy one, some, or all of these needs.

The cube PBS can comprise a pair of wire-grid polarizers, including a first wire-grid polarizer and a second wire-grid polarizer sandwiched between a first prism and a second prism.

In one embodiment, there can be a boundary layer between the first wire-grid polarizer and the second wire-grid polarizer.

In another embodiment, the cube PBS can polarize a beam of light into (a) a transmitted beam of light transmitting linearly through the cube PBS and through the pair of wire-grid polarizers and (b) a reflected beam of light reflecting off of the pair of wire-grid polarizers while satisfying the equation: $|OPL_T - OPL_R| < 300$ micrometers; where an optical path length is a distance of light travel through a material multiplied by an index of refraction of the material, $OPL_T$ is an optical path length of the transmitted beam, and OPL is an optical path length of the reflected beam.

In another embodiment, for incident light across a wavelength range of 300 nanometers, with an angle of incidence on the pair of wire-grid polarizers from 25-65 degrees, contrast can be at least 3000, where contrast equals Tp/Ts, Tp equals a percent transmission of a predominantly-transmitted polarization, and Ts equals a percent transmission of an opposite polarization.

BRIEF DESCRIPTION OF THE DRAWINGS (DRAWINGS MIGHT NOT BE DRAWN TO SCALE)

DEFINITIONS

As used herein, the term "cube" means an approximately cube-shaped optical device, usually with about six sides. Opposite sides are not necessarily parallel, and the sides do not have to have the same area with respect to each other, unless explicitly specified otherwise. Examples of cubes are shown in the figures.

DETAILED DESCRIPTION

As illustrated in FIGS. 1-4, cube polarizing beam splitters (PBSs for plural or PBS for singular) 10 and 30 are shown comprising a pair of prisms including a first prism 11 and a second prism 12. A pair of wire-grid polarizers, including a first wire-grid polarizer 13 and a second wire-grid polarizer 14 can be sandwiched between the first prism 11 and the second prism 12. The first wire-grid polarizer 13 can comprise an array of elongated wires, defining a first array $13_a$, on a first substrate $13_s$. A second wire-grid polarizer 14 can comprise an array of elongated wires, defining a second array $14_a$, on a second substrate $14_s$.

A plane of a surface of the first substrate $13_s$ on which the first array $13_a$ is located can be parallel or substantially parallel to a plane of a surface of the second substrate $14_s$ on which the second array $14_a$ is located. Both planes can extend into the page of the figures. A length of the elongated wires of the first array $13_a$ can be parallel or substantially parallel to a length of the elongated wires of the second array $14_a$. Both lengths extend into the page of the figures.

Figure 7:
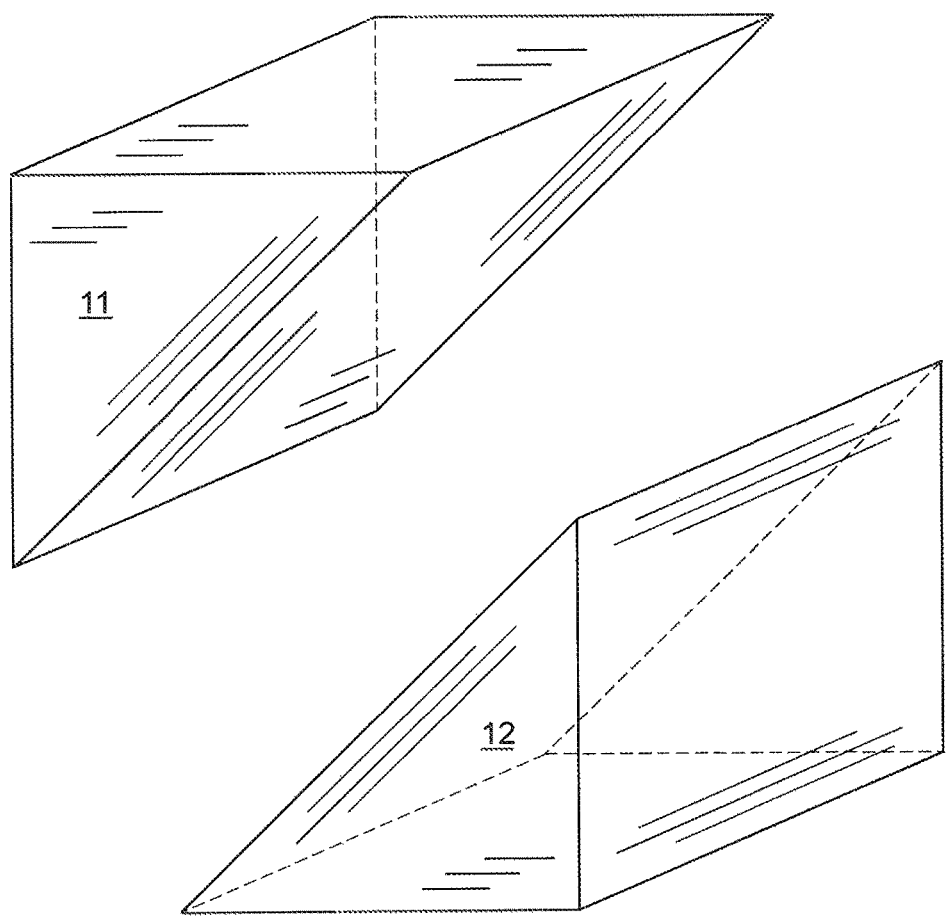
FIG. 7 is a schematic perspective-view of the pair of prisms, in accordance with an embodiment of the present invention.

The pair of prisms 11 and 12 are shown in FIG. 7 in three-dimensional view, without the pair of wire-grid polarizers. A profile (or shape) of the first prism 11 can be the same as a profile (or shape) of the second prism 12. The first prism 11 can have the same dimensions as the second prism 12. Equality or the "profile", "shape", and "dimensions" of the prisms 11 and 12 mean equality within normal manufacturing tolerances. In other words, equality of profile and dimensions of the prisms 11 and 12 means interchangeability during manufacturing, unless a specific surface treatment is performed on a face of one but not the other. Interchangeability of the prisms 11 and 12 can allow for easier manufacturing.

Using a pair of wire-grid polarizers instead of a single wire-grid polarizer can improve contrast of the cube PBS. Contrast is a fraction transmission of a predominantly-transmitted polarization (e.g. Tp) divided by a fraction transmission of a predominantly-reflected polarization (e.g. Ts); i.e. contrast=Tp/Ts. Using wire-grid polarizers in the cube can allow good performance across a large range of incident angles and good performance across a large wavelength range. For example, for incident light across a wavelength range of 100 nanometers in one aspect, 200 nanometers in another aspect, or 300 nanometers in another aspect, with an angle of incidence on the pair of wire-grid polarizers from 25-65 degrees, contrast can be at least 3000.

Symmetry is another advantage of using a pair of wire-grid polarizers in the cube PBS. Symmetry, within manufacturing tolerances, can be attained with two wire-grid polarizers 13 and 14 sandwiched between two prisms 11 and 12 that have equal profile and dimensions.

Figure 1:
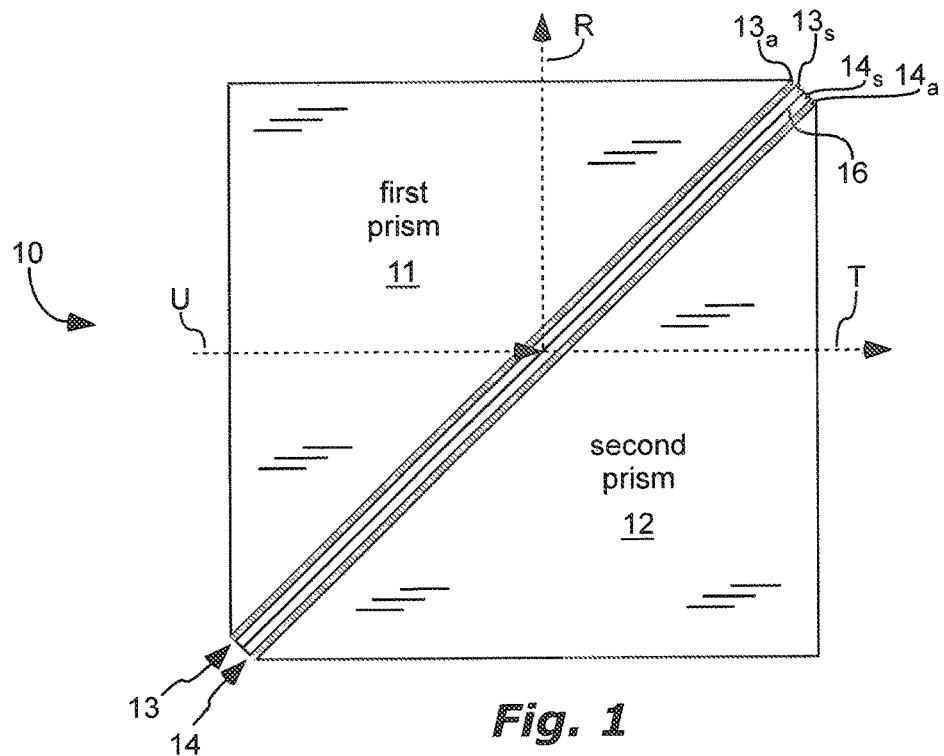
FIG. 1 is a schematic, cross-sectional side-view of a cube polarizing beam splitter (PBS) with a pair of wire-grid polarizers sandwiched between a pair of prisms, and substrates of the wire-grid polarizers sandwiched between wires of the wire-grid polarizers, in accordance with an embodiment of the present invention.
Figure 3:
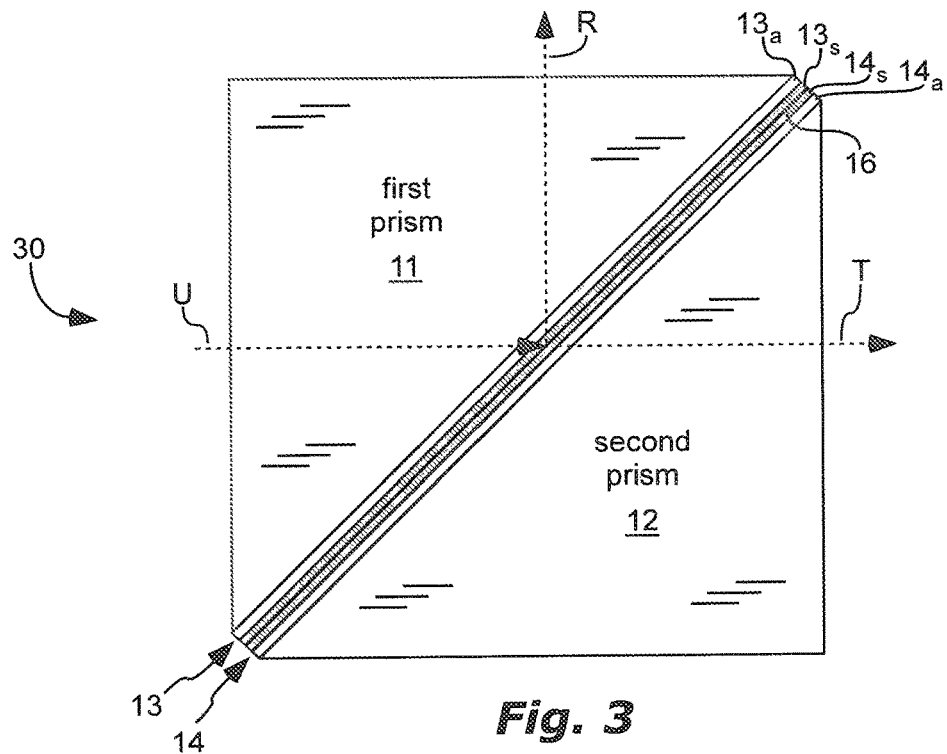
FIG. 3 is a schematic, cross-sectional side-view of a cube PBS with a pair of wire-grid polarizers sandwiched between a pair of prisms, and wires of the wire-grid polarizers sandwiched between substrates of the wire-grid polarizers, in accordance with an embodiment of the present invention.

As shown in FIGS. 1 and 3, the cube PBS 10 or 30 can split a beam of light U into a transmitted beam of light T transmitting linearly through the cube PBS 10 or 30 and through the pair of wire-grid polarizers 13 and 14 and a reflected beam of light R reflecting off of the pair of wire-grid polarizers 13 and 14. It can be beneficial for some applications, e.g. interferometer, for an optical path length of the transmitted beam $OPL_T$ to be equal or approximately equal to an optical path length of the reflected beam $OPL_R$. Optical path length (OPL) is a distance of light travel through a material multiplied by an index of refraction of the material. For example, $|OPL_T-OPL_R|<400$ micrometers in one aspect, $|OPL_T-OPL_R|<300$ micrometers in another aspect, $|OPL_T-OPL_R|<100$ micrometers in another aspect, $|OPL_T-OPL_R|<50$ micrometers in another aspect, or $|OPL_T-OPL_R|<10$ micrometers in another aspect.

There can be a boundary layer 16 between the first wire-grid polarizer 13 and the second wire-grid polarizer 14. The boundary layer 16 can be designed by its thickness and material for optimal cube PBS 10 or 30 performance. Each design may have a unique combination of boundary layer 16 thickness and material. The boundary layer 16 can be a layer of adhesive, binding the first wire-grid polarizer 13 to the second wire-grid polarizer 14. The boundary layer 16 can be an adhesive-free optical bond between two, separately-manufactured substrates, such as for example the adhesive-free bond taught in U.S. Pat. Nos. 6,284,085 and 6,548,176, both of which are incorporated herein by reference. The boundary layer 16 can be a layer extending continuously along a single plane across a width of the pair of wire-grid polarizers.

In some designs, it can be beneficial for the boundary layer 16 to have a minimum thickness. For example, the boundary layer 16 can have a minimum thickness of at least 0.01 micrometer in one aspect, a minimum thickness of at least 0.1 micrometer in another aspect, a minimum thickness of at least 1 micrometer in another aspect, or a minimum thickness of at least 5 micrometers in another aspect.

In some designs, it can be beneficial for the boundary layer 16 to have a maximum thickness. For example, the boundary layer 16 can have a maximum thickness of less than 1 micrometer in one aspect, a maximum thickness of less than 10 micrometers in another aspect, a maximum thickness of less than 50 micrometers in another aspect, or a maximum thickness of less than 100 micrometers in another aspect.

Figure 2:
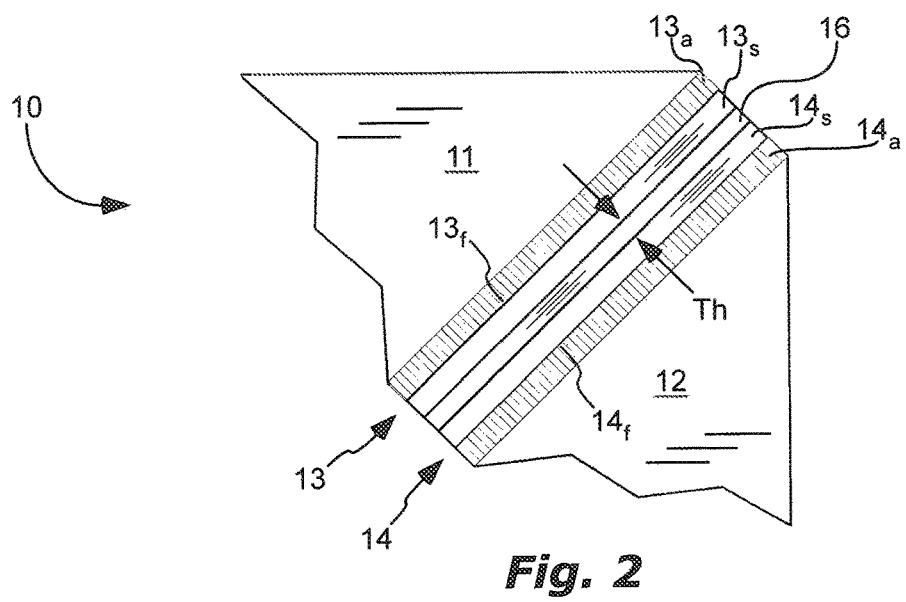
FIG. 2 is a schematic, cross-sectional side-view of a portion of the cube PBS of FIG. 1, in accordance with an embodiment of the present invention.

As shown on cube PBS 10 in FIGS. 1-2, the first substrate $13_s$ and the second substrate $14_s$ can be sandwiched between the first array $13_a$ and the second array $14_a$. The boundary layer 16 can be located between, and can adjoin, the first substrate $13_s$ and the second substrate $14_s$.

Figure 4:
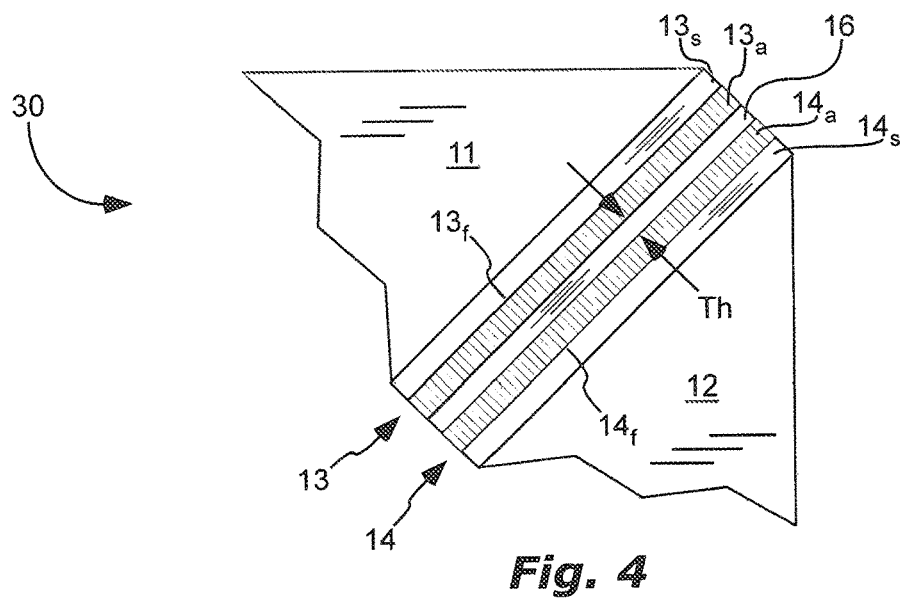
FIG. 4 is a schematic, cross-sectional side-view of a portion of the cube PBS of FIG. 3, in accordance with an embodiment of the present invention.

As shown on cube PBS 30 in FIGS. 3-4, the first array $13_a$ and the second array $14_a$ can be sandwiched between the first substrate $13_s$ and the second substrate $14_s$ and the boundary layer 16 can be located between, and can adjoin, the first array $13_a$ and the second array $14_a$. A choice between cube PBS 10 or cube PBS 30 can be made based on desired performance, available adhesives, and ease of manufacturing.

The cube PBS can include a pair of wire-grid polarizers, each including an array of elongated wires, sandwiched between the first prism 11 and the second prism 12. Each array of elongated wires can share the same substrate. One array of elongated wires can be located on one side of the substrate and the other array of elongated wires can be located on an opposite side of the substrate. Alternatively, both arrays of elongated wires can both be located on one side (i.e. the same side) of the substrate.

Figure 5:
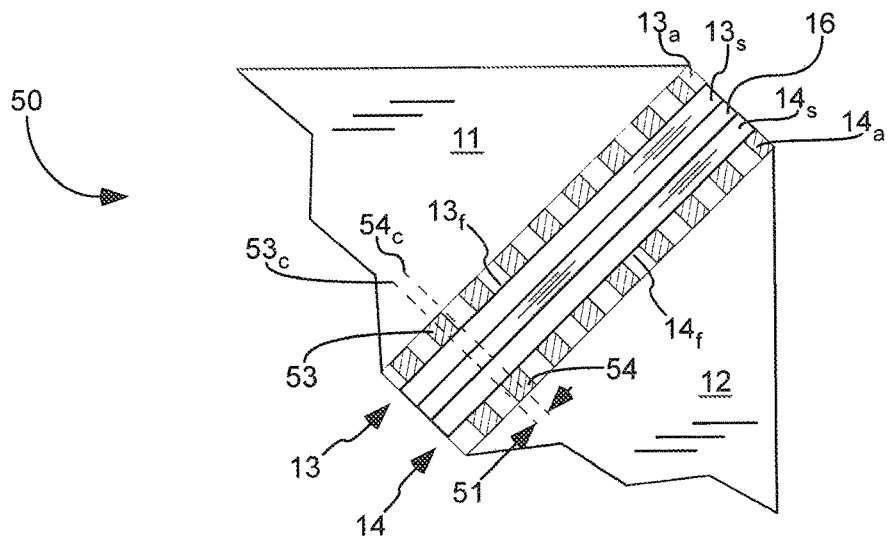
FIG. 5 is a schematic, cross-sectional side-view of a portion of a cube PBS, with wires of the first array and wires of the second array laterally offset with respect to each other, in accordance with an embodiment of the present invention.

Shown in FIG. 5 is a portion of a cube PBS 50, similar to those described above, but with larger wires 53 and 54 (wire 53 and 54 lengths into the figure), to show a lateral-offset 51 of wires 53 of the first array $13_a$ with respect to wires 54 of the second array $14_a$. Although cube PBS 50 shows the first substrate $13_s$ and the second substrate $14_s$ sandwiched between the first array $13_a$ and the second array $14_a$, there can also be a lateral-offset 51 with the first array $13_a$ and the second array $14_a$ sandwiched between the first substrate $13_s$ and the second substrate $14_s$.

Shown in FIG. 5 is a first-center line $53_c$, which is a line through a center of a wire 53 of the first array $13_a$ extending perpendicular to a face $13_f$ of the first substrate $13_s$. Also shown in FIG. 5 is a second-center line $54_c$, which is a line through a center of a wire 54 of the second array $14_a$ closest to the wire 53 of the first array $13_a$ of the prior sentence, extending perpendicular to a face $14_f$ of the second substrate $14_s$. As shown in FIG. 5, there is a lateral-offset 51 distance between the first-center line $53_c$ and the second-center line $54_c$. The lateral-offset can improve cube PBS performance, can allow for easier manufacturability, or both. A specific lateral-offset 51 can be selected for each specific cube PBS design. Examples of lateral-offsets 51 include at least 3 nanometers in one aspect, at least 5 nanometers in another aspect, at least 15 nanometers in another aspect, at least 30 nanometers in another aspect, less than 40 nanometers in another aspect, and less than 100 nanometers in another aspect.

Figure 6:
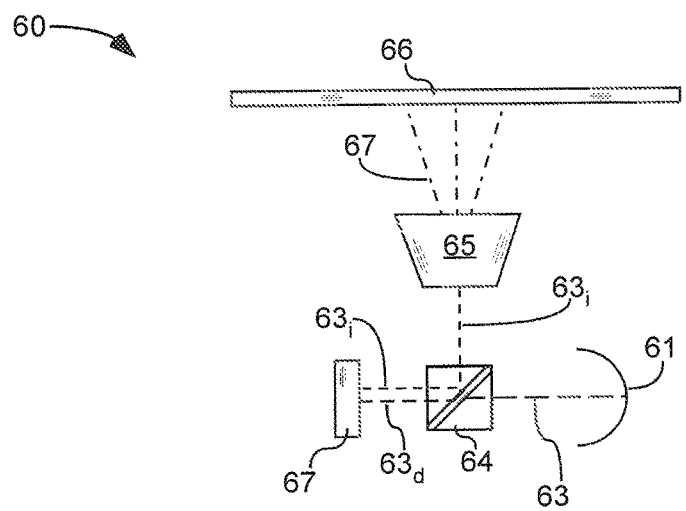
FIG. 6 is a schematic, cross-sectional side-view of a projection lens system including a cube PBS, in accordance with an embodiment of the present invention.

Shown in FIG. 6 is an image projector 60 including a cube PBS 64. The cube PBS 64 can have characteristics according to the embodiments described above. The image projector 60 can comprise a light source 61 located to emit a beam of light 63 into the cube PBS 64. The cube PBS 64 can separate the beam of light 63 into a pair of polarized beams, including a desired beam $63_d$ and an additional beam (not shown).

The desired beam $63_d$ can have a higher light intensity than the additional beam. The desired beam $63_d$ can have one polarization and the additional beam can have an opposite polarization. The desired beam $63_d$ shown in FIG. 6 transmits through the cube PBS 64, but the cube PBS 64 can be configured for the opposite, that is for the desired beam $63_d$ to reflect off the pair of wire grid polarizers in the cube PBS 64. The desired beam $63_d$ can emit out of the cube PBS 64.

A spatial light modulator 67 can be located to receive the desired beam $63_d$ from the cube PBS 64. The spatial light modulator 67 can have a plurality of pixels, each pixel capable of receiving a signal and transmitting or reflecting a portion of the desired beam $63_d$ without causing a change in polarization, or rotating a polarization of a portion of the desired beam $63_d$, based on the signal, creating an image beam $63_i$ of selectively polarized light.

The image beam $63_i$ can transmit through the spatial light modulator 67 or can be reflected back to the cube PBS 64. The image beam $63_i$, if reflected back to the cube PBS 64, can reflect off of the pair of wire grid polarizers, as shown in FIG. 6, or can transmit through the cube PBS 64.

The image projector 60 can also comprise a projection lens system 65. The spatial light modulator 67 and the projection lens system 65 can be oriented for the spatial light modulator 67 to emit the image beam $63_i$ into the projection lens system 65. The projection lens system 65 can project an image 67 onto a screen 66 or directly into the eye of a viewer.

What is claimed is:

1. A cube polarizing beam splitter (PBS) comprising:
a pair of prisms including a first prism and a second prism;
a pair of wire-grid polarizers, including a first wire-grid polarizer comprising an array of elongated wires, defining a first array, on a first substrate; and a second wire-grid polarizer comprising an array of elongated wires, defining a second array, on a second substrate;
the first and second wire-grid polarizers sandwiched between the first prism and the second prism;
a boundary layer between the first wire-grid polarizer and the second wire-grid polarizer;
the first substrate and the second substrate are sandwiched between the first array and the second array and the boundary layer is located between and adjacent to the first substrate and the second substrate.

2. The cube PBS of claim 1, wherein the boundary layer is an adhesive-free optical bond.

3. The cube PBS of claim 1, wherein the boundary layer is a layer of adhesive, binding the first wire-grid polarizer to the second wire-grid polarizer.

4. The cube PBS of claim 1, wherein the boundary layer has a minimum thickness of at least 0.1 micrometer.

5. The cube PBS of claim 1, wherein the boundary layer has a maximum thickness of less than 100 micrometers.

6. The cube PBS of claim 1, wherein, for incident light across a wavelength range of 200 nanometers, with an angle of incidence on the pair of wire-grid polarizers from 25-65 degrees, contrast is at least 3000, where:
a) contrast=Tp/Ts;
b) Tp=percent transmission of a predominantly transmitted polarization;
c) Ts=percent transmission of an opposite polarization.

7. The cube PBS of claim 1, wherein, for incident light across a wavelength range of 300 nanometers, with an angle of incidence on the pair of wire-grid polarizers from 25-65 degrees, contrast is at least 3000, where:
a) contrast=Tp/Ts;
b) Tp=percent transmission of a predominantly transmitted polarization;
c) Ts=percent transmission of an opposite polarization.

8. The cube PBS of claim 1, wherein the cube PBS forms part of an image projector, the image projector comprising:
a) a light source located to emit a beam of light into the cube PBS, the cube PBS separating the beam of light into a pair of polarized beams, including a desired beam and an additional beam, the desired beam having a higher light intensity than the additional beam, and emitting the desired beam out of the cube PBS;
b) a spatial light modulator:
i) located to receive the desired beam from the cube PBS; and
ii) having a plurality of pixels, each pixel capable of receiving a signal and transmitting or reflecting a portion of the desired beam without causing a change in polarization, or rotating a polarization of a portion of the desired beam, based on the signal, creating an image beam of selectively polarized light.

9. The image projector of claim 8, further comprising a projection lens system, wherein the spatial light modulator and the projection lens system are oriented for the spatial light modulator to emit the image beam into the projection lens system and the projection lens system is capable of projecting an image.

10. The cube PBS of claim 1, wherein:
a) a plane of a surface of the first substrate on which the first array is located is parallel to a plane of a surface of the second substrate on which the second array is located; and
b) a length of the elongated wires of the first array is parallel to a length of the elongated wires of the second array.

11. The cube PBS of claim 1, wherein the cube PBS is capable of polarizing a beam of light, wherein:
the beam of light splits into a transmitted beam of light transmitting linearly through the cube PBS and through the pair of wire-grid polarizers and a reflected beam of light reflecting off of the pair of wire-grid polarizers; and
$|OPL_T - OPL_R| < 300$ micrometers where an optical path length is a distance of light travel through a material multiplied by an index of refraction of the material, $OPL_T$ is an optical path length of the transmitted beam, and $OPL_R$ is an optical path length of the reflected beam.

12. A cube polarizing beam splitter (PBS) comprising:
a pair of prisms including a first prism and a second prism;
a pair of wire-grid polarizers, including a first wire-grid polarizer comprising an array of elongated wires, defining a first array, on a first substrate; and a second wire-grid polarizer comprising an array of elongated wires, defining a second array, on a second substrate;
the first and second wire-grid polarizers sandwiched between the first prism and the second prism;
a boundary layer between the first wire-grid polarizer and the second wire-grid polarizer; and
wires of the first array and wires of the second array are laterally offset with respect to each other, defining a lateral-offset, such that a line through a center of a wire of the first array, perpendicular to a face of the first substrate, is laterally offset with respect to a line through a center of a wire of the second array closest to the wire of the first array, extending perpendicular to a face of the second substrate.

13. The cube PBS of claim 12, wherein the first array and the second array are sandwiched between the first substrate and the second substrate and the boundary layer is located between and adjacent to the first array and the second array.

14. The cube PBS of claim 12, wherein the lateral-offset is at least 15 nanometers.

15. The cube PBS of claim 12, wherein:
   a) a plane of a surface of the first substrate on which the first array is located is parallel to a plane of a surface of the second substrate on which the second array is located; and
   b) a length of the elongated wires of the first array is parallel to a length of the elongated wires of the second array.

16. The cube PBS of claim 12, wherein the cube PBS is capable of polarizing a beam of light, wherein:
   the beam of light splits into a transmitted beam of light transmitting linearly through the cube PBS and through the pair of wire-grid polarizers and a reflected beam of light reflecting off of the pair of wire-grid polarizers; and
   $|OPL_T - OPL_R| < 300$ micrometers where an optical path length is a distance of light travel through a material multiplied by an index of refraction of the material, $OPL_T$ is an optical path length of the transmitted beam, and $OPL_R$ is an optical path length of the reflected beam.

17. A cube polarizing beam splitter (PBS) comprising:
   a pair of prisms including a first prism and a second prism;
   a pair of wire-grid polarizers, including a first wire-grid polarizer comprising an array of elongated wires, defining a first array, on a first substrate; and a second wire-grid polarizer comprising an array of elongated wires, defining a second array, on a second substrate;
   the first and second wire-grid polarizers sandwiched between the first prism and the second prism;
   for incident light across a wavelength range of 300 nanometers, with an angle of incidence on the pair of wire-grid polarizers from 25-65 degrees, contrast is at least 3000, where contrast=Tp/Ts; Tp=percent transmission of a predominantly transmitted polarization; and Ts=percent transmission of an opposite polarization; and
   wires of the first array and wires of the second array are laterally offset with respect to each other, defining a lateral-offset, such that a line through a center of a wire of the first array, perpendicular to a face of the first substrate, is laterally offset with respect to a line through a center of a wire of the second array closest to the wire of the first array, extending perpendicular to a face of the second substrate.

18. The cube PBS of claim 17, wherein:
   a) a plane of a surface of the first substrate on which the first array is located is parallel to a plane of a surface of the second substrate on which the second array is located; and
   b) a length of the elongated wires of the first array is parallel to a length of the elongated wires of the second array.

19. The cube PBS of claim 17, wherein the cube PBS is capable of polarizing a beam of light, wherein:
   the beam of light splits into a transmitted beam of light transmitting linearly through the cube PBS and through the pair of wire-grid polarizers and a reflected beam of light reflecting off of the pair of wire-grid polarizers; and
   $|OPL_T - OPL_R| < 300$ micrometers where an optical path length is a distance of light travel through a material multiplied by an index of refraction of the material, $OPL_T$ is an optical path length of the transmitted beam, and $OPL_R$ is an optical path length of the reflected beam.

20. The cube PBS of claim 17, wherein the lateral-offset is at least 15 nanometers.

* * * * *